April 24, 1934

M. B. TARK

Re. 19,146

SEWAGE DISPOSAL APPARATUS

Original Filed March 22, 1927

3 Sheets-Sheet 1

Inventor,
Marcus B. Tark,
by his Attorneys,
Howson & Howson

April 24, 1934. M. B. TARK Re. 19,146

SEWAGE DISPOSAL APPARATUS

Original Filed March 22, 1927 3 Sheets-Sheet 2

Inventor:-
Marcus B. Tark,
by his Attorneys,
Howson & Howson

April 24, 1934. M. B. TARK Re. 19,146
SEWAGE DISPOSAL APPARATUS
Original Filed March 22, 1927 3 Sheets-Sheet 3
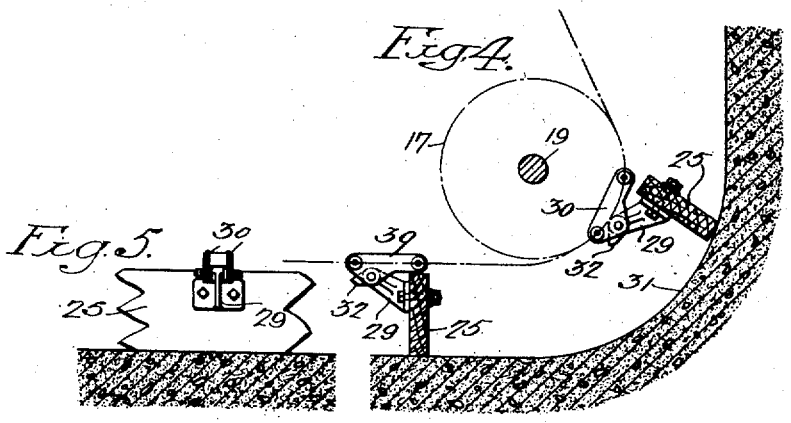
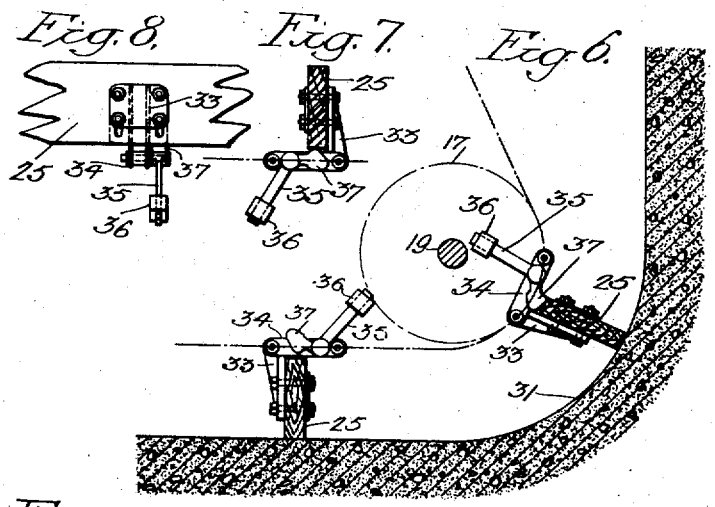
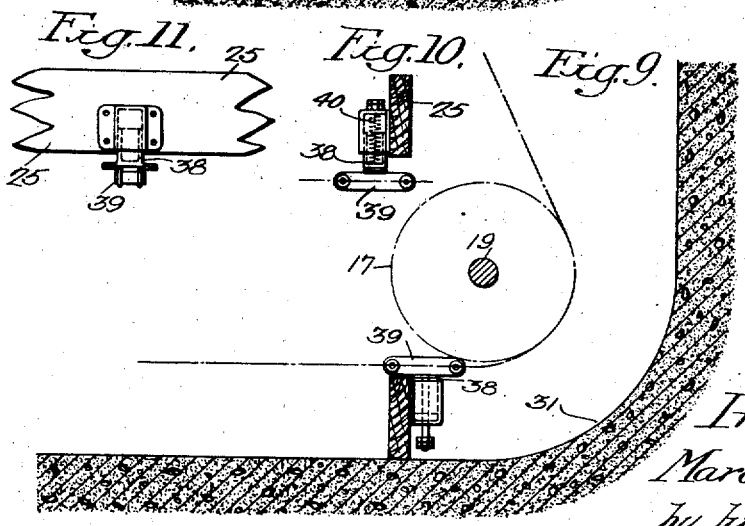
Inventor;-
Marcus B. Tark,
by his Attorneys
Howson & Howson.

Reissued Apr. 24, 1934

Re. 19,146

UNITED STATES PATENT OFFICE 19,146

SEWAGE DISPOSAL APPARATUS

Marcus B. Tark, Philadelphia, Pa., assignor to Link-Belt Company, Chicago, Ill., a corporation of Illinois Original No. 1,763,412, dated June 10, 1930, Serial No. 177,372, March 22, 1927. Application for reissue April 23, 1931, Serial No. 532,381

14 Claims. (Cl. 210—3)

This invention relates to improvements in sewage disposal apparatus, and has for its principal object the provision of novel and highly advantageous means for removing the precipitated sludge from the sedimentation tanks and accumulations from analogous operations.

Considerable difficulty has been experienced in the past in removing precipitated sludge accumulating in the bottoms of tanks constituting a part of sewage disposal systems, and the present invention contemplates the provision in the tanks of mechanical means for collecting the sludge in suitable chambers or hoppers from which it may be removed by gravity or by means of a pump or other conveyer.

The invention further comprehends certain novel structural features of the mechanical sludge-collecting means and of the tanks in which they operate, whereby the operation of the said collecting means and the apparatus as a whole is made highly efficient.

A further novel feature of the invention resides in the provision of means for collecting and removing scum, grease and oil from the surface of the liquid in the tanks.

A further and more specific object of the invention is the provision in the collecting mechanism of means adapting the operation thereof to the more or less irregular surfaces of concrete tanks in which they may be used.

In the attached drawings:

Fig. 4 is a fragmentary sectional enlargement showing the effluent end of the tank and illustrating details of the mechanical collector;

Fig. 5 is a fragmentary elevation of one of the flights forming a part of the collector;

Fig. 6 is a view similar to Fig. 4, but illustrating a modification in the construction of the collector;

Fig. 7 is an end elevation of one of the flights illustrating details of the collector construction shown in Fig. 6;

Fig. 8 is a fragmentary front elevation of the flight shown in Fig. 7;

Fig. 9 is a view similar to Figs. 4 and 6, illustrating a still further modification of the collector mechanism;

Fig. 10 is an end elevation showing details of the flights of the collector shown in Fig. 9, and Fig. 11 is a fragmentary front elevation of the flight shown in Fig. 10.

Figure 1:
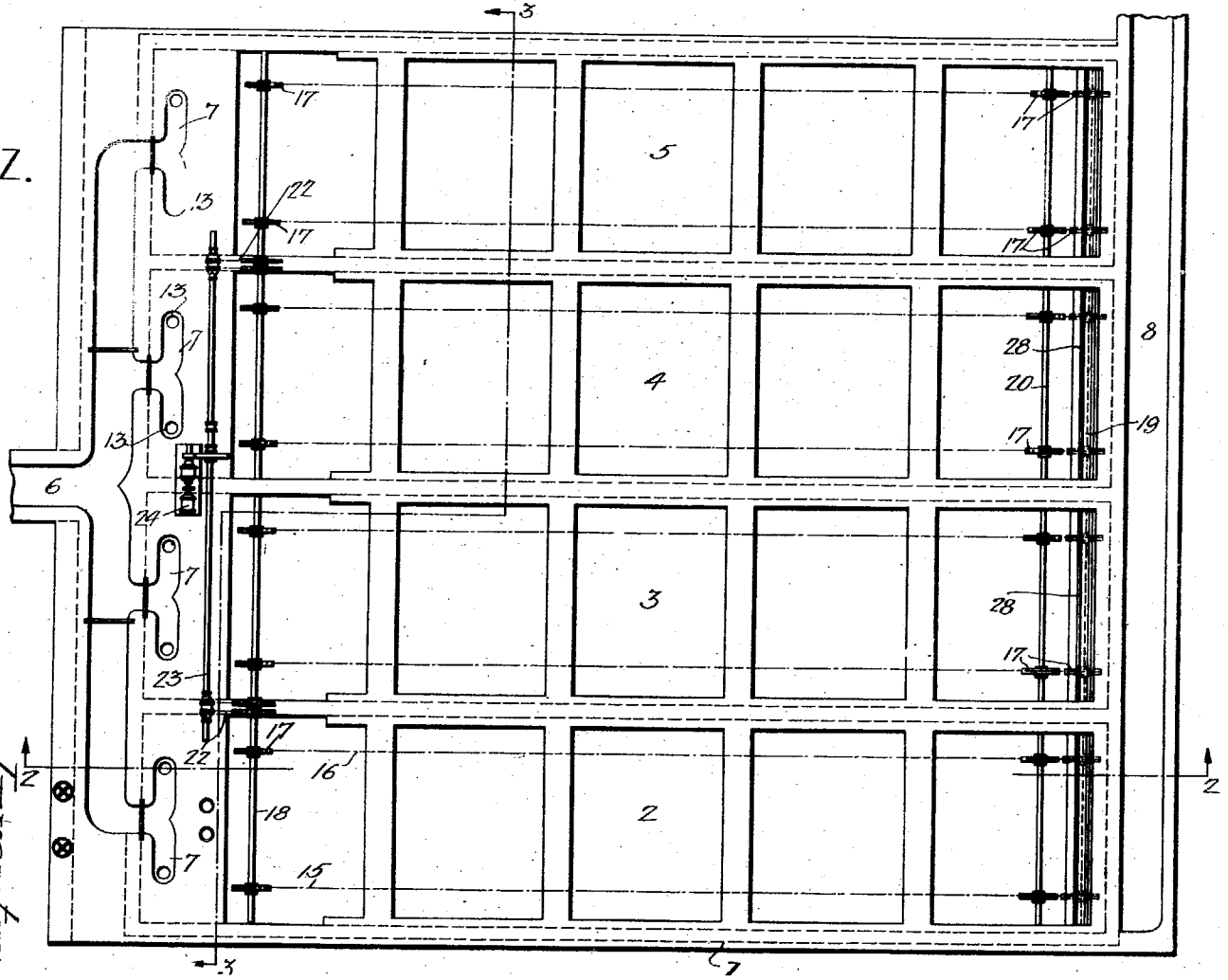
Figure 1 is a plan view of a sediment tank made in accordance with my invention.

Referring to the drawings, the apparatus illustrated comprises a main tank 1 having four independent longitudinal sludge chambers, 2, 3, 4 and 5, respectively. Sewage is fed to these chambers from a common influent channel 6 and through independent branch channels 7 connecting with the channel 6. The sludge-free liquid is collected and drawn off from the various chambers through a common effluent channel 8 at the opposite end of the tank structure from the influent channel 6. In that the individual chambers and the associated apparatus are identical, further description will be confined for the sake of brevity to a single chamber.

The tank chamber, the length of which preferably is from three to five times its width, has at its influent end one or more hoppers 9 extending below the floor level of the major portion of the tank, the hoppers in the present instance numbering two and being separated by a wall 10 tapered at the top and with its upper edge substantially on a line with the floor level of the major portion of the tank. The hoppers 9, 9 constitute the sump in which the sludge is collected in a manner hereinafter described and from which it may be drawn through pipes 11 extending to the bottom of the hoppers, as illustrated, and connected through the wall of the tank with a pipe line 12 extending to suitable pumping apparatus (not shown).

Figure 2:
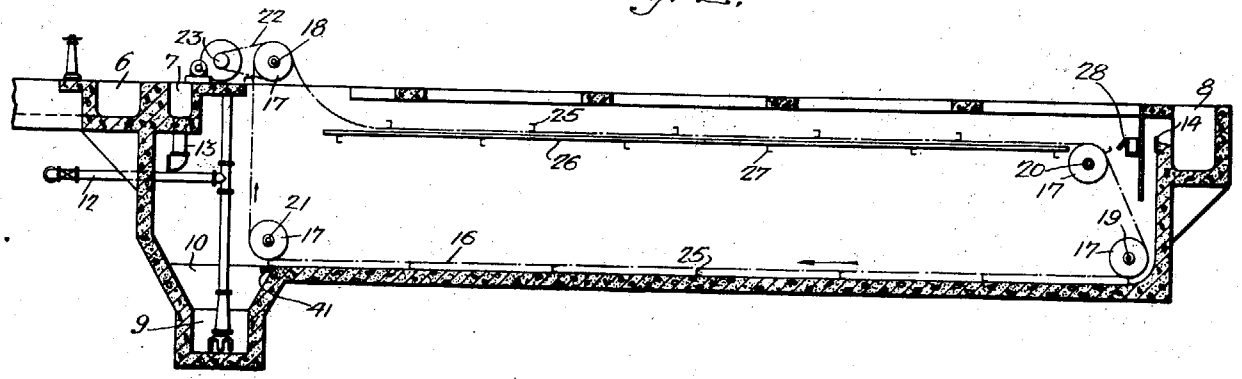
Fig. 2 is a longitudinal section on the line 2—2, Fig. 1.
Figure 3:
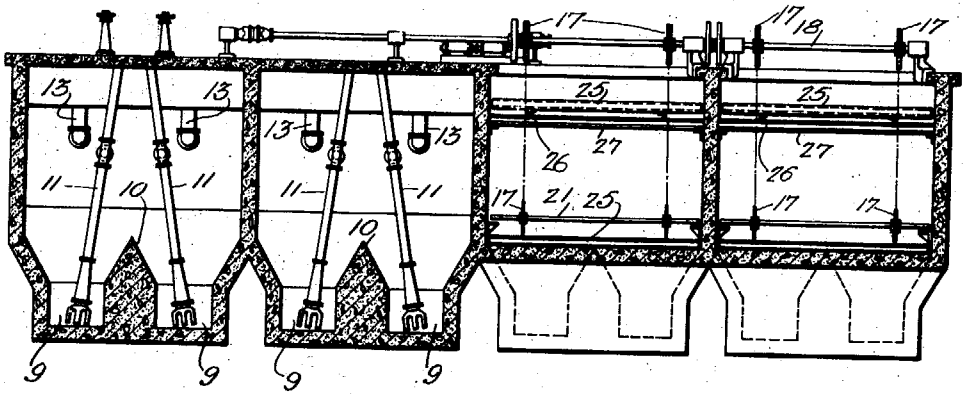
Fig. 3 is a transverse section on the line 3—3, Fig. 1.

The sewage is admitted to the tanks from the channels 7 through submerged pipes 13, there being two of these pipes for each chamber, in the present instance, located respectively above the hoppers 9, as shown in Fig. 3. The pipes 13 discharge horizontally, as indicated in Fig. 2, so that the influent substance is projected against the wall of the tank. A large part of the suspended solids in the liquid entering the tank settles immediately into the hoppers 9, the remainder being carried towards the effluent end and settling out to the bottom of the major portion of the tank, leaving a clear liquid eventually which discharges over a weir 14 into the effluent channel 8 at the opposite end of the tank. The weir preferably is vertically adjustable.

In order to eliminate the sludge which collects in the bottom of the tank, I provide a submerged sludge collector mechanism, which consists in a preferred form of two endless strands of chain 15 and 16 which operate upon a series of sprockets 17, as shown in Fig. 2. These sprockets are carried respectively upon a head shaft 18, a foot shaft 19, and upper and lower turn shafts 20 and 21 respectively. The shaft 18 is connected through a chain 22 with a countershaft 23, and this countershaft is connected by suitable gearing with a motor 24 which constitutes the prime mover for the chains 15 and 16. The chains are connected at predetermined intervals with cross pieces or flights 25 which project from the outer sides of the chains, and the foot shaft 19 and turn shaft 21 are so mounted in the tank that these flights wipe the bottom of the tank, as clearly illustrated. The flights 25 may be made of any suitable material such as steel or wood.

In the top of the tank are mounted rails 26, these being supported in the present instance on transverse beams 27, these rails being adapted to support and guide the upper run of the chains at a predetermined level in the tank. This level corresponds closely to the normal liquid level so that the flights 25 are only partially submerged in the top run of the chains. The chains moved in the direction indicated by the arrows in Fig. 2, and in the lower run of the chains, the flights 25 function to sweep the precipitated sludge from the tank into the sump. In the arrangement described, the flights 25 are utilized in the upper or return run of the chains to collect the scum, grease and oil at the surface of the liquid and to carry it into a scum trough 28 at the effluent end of the tank, the scum being conducted away or withdrawn from the trough in suitable manner.

It is essential that all of the settled sludge be removed from the tank, and as it is difficult to finish concrete to give accurately smooth surfaces, I provide means in the collectors to compensate for unevenness in the masonry and to compensate also for wear in the flights or scrapers. This means I have illustrated in Figs. 4 to 11, inclusive. In the embodiment shown in Figs. 4 and 5, the flights are carried by arms 29 which are pivotally secured to the carrying links 30 of the chains. With this arrangement, when the flight travels over the upper turn shaft 20, it drops forward until it comes into contact with the bottom wall of the tank. In order to make the action of the flights embrasive of the entire length of the tank, the corner where the bottom of the tank joins the front wall is rounded out, as indicated at 31, and as shown in Fig. 4, the curve 31 is so related to the shaft 19 that the flight comes into contact with the surface of the tank at the top of this curved corner. This prevents accumulations at the corner which would prevent a thorough cleaning action of the flights and which might tend to clog the apparatus.

In the embodiment shown in Figs. 4 and 5, the arm 29 is provided with a stop 32 which by engagement of the link 30 positively limits the downward movement of the flight and prevents jamming.

Another embodiment of the device is shown in Figs. 6, 7 and 8. In this instance, the flight 25 is slidably mounted in a bracket 33 secured to the carrying link 34. Also pivoted on the link 34 is a lever 35, one arm of which is weighted at 36, while the other arm 37 engages the inner edge of the flight. The arrangement is such that when the flight passes over the shaft 20, the arm 37 is brought by the action of the weight 36 against the inner edge of the flight 25 and tends to force the latter outwardly on the supporting bracket 33. The lever 35 functions during the downward movement of the flight around the curved corner 31, but during the major portion of the rearward run of the flight, it is held resiliently in contact with the bottom of the tank by its own weight.

A somewhat similar arrangement is shown in Figs. 9, 10 and 11. In this instance also, the flight 25 is slidably mounted on an arm 38 on the carrying link 39, but a spring 40 replaces the weighted arm 35 and functions after the manner of said weight to resiliently hold the flight in an extended position on the brackets 38.

In each of the aforesaid devices, it will be noted that the flight resiliently or flexibly engages the surface of the tank whereby irregularities and unevenness in the said surface are fully compensated.

By reference to Fig. 2, it will be noted that at the inner edge of the hopper 9, overhanging rails 41 are provided which form an extension of the track in the bottom of the main portion of the tank, projecting over the forward edges of the hopper and beyond the centre line of the lower turn shaft. These overhanging tracks prevent a sudden drop of the pivoted flights. Such a drop will agitate the settled solids and cause a portion of them to go again into suspension.

It will be obvious that there may be much modification in the detail structure of the tanks and of the collector apparatus without departure from the essential features of the invention.

I claim:

1. In sewage disposal apparatus, the combination with a settling tank having a substantially vertical end wall and where the bottom joins the said wall a rounded corner, of sludge-removing means at the opposite end of the tank, an endless conveyer having rigid transverse flights adapted to sweep the accumulated sludge in the bottom of the tank to said removing means, and means affording free movement of the flights away from the conveyer and into engagement with the rounded corner and the bottom of the tank to thereby effect a substantially complete removal of said sludge from the tank.

2. In sewage disposal apparatus, the combination with a settling tank having a depressed hopper at one end and having the lower transverse corner at the opposite end where the end wall meets the bottom of the tank rounded substantially on the arc of a circle, a sludge collector in said tank including a pair of transverse shafts, and an endless conveyer operating on said shafts, the shaft adjacent the rounded end of the tank being arranged concentrically with the aforesaid rounded transverse corner, and flights carried by said conveyer and adapted to sweep the said rounded corner and the bottom of the tank so as to carry the entire mass of accumulated sludge toward and into the said hopper.

3. In a sewage disposal apparatus, the combination with a settling tank having a substantially vertical end wall and where the bottom joins the said wall a rounded corner, the side walls of said tank and said end wall being formed with upwardly extending surfaces confining the entire mass of accumulated sludge, of sludge-removing means at the end of the tank opposite said rounded corner, an endless conveyer having rigid transverse flights adapted to sweep the entire mass of accumulated sludge in the bottom of the tank to said removing means, and means affording free movement of the flights away from the conveyer and into engagement with the said rounded corner and the bottom of the tank to thereby effect a substantially complete removal of the said sludge from the tank.

4. In a sewage disposal apparatus, the combination with a settling tank having a substantially vertical end wall and where the bottom joins the said wall a rounded corner, of sludge-removing means at the opposite end of the tank, an endless conveyer having rigid flights adapted to sweep the accumulated sludge in the bottom of the tank to said removing means, said flights being mounted on said conveyor for limited free movement from the plane of the conveyer in excess of the normal distance between said conveyer and the surface of the rounded corner and bottom surface of the tank to cooperatively engage said rounded corner and the bottom of the tank to thereby effect a substantially complete removal of said sludge from the tank and to maintain said cooperative engagement after wear in the flights occurs.

5. In sewage disposal apparatus, the combination with a settling tank having a substantially vertical end wall and where the bottom joins said wall a rounded corner, of sludge removing means at the opposite end of the tank, an endless conveyer having rigid transverse flights adapted to sweep the accumulated sludge in the bottom of the tank to said removing means, arms secured to said conveyer for supporting said flights, and means affording free movement of the flights away from the conveyer and into engagement with the said rounded corner and the bottom of the tank to thereby effect a substantially complete removal of the said sludge from the tank.

6. In sewage disposal apparatus, the combination with a settling tank having a substantially vertical end wall and where the bottom joins said wall a rounded corner, of sludge-removing means at the opposite end of the tank, an endless conveyer having rigid transverse flights adapted to sweep the accumulated sludge in the bottom of the tank to said removing means, and arm supporting said flights and pivotally attached to the conveyer whereby the flights are freely movable by gravity into engagement with the said rounded corner and the bottom of the tank to thereby effect a substantially complete removal of said sludge from the tank.

7. In sewage disposal apparatus, the combination with a settling tank having the corner at one end where the bottom joins the end wall rounded and having at the other end a depressed hopper, of an endless conveyer extending from one end of the tank to the other, flights mounted on said conveyer upon axes transverse to the tank, and means affording free movement of said flights into engagement with the bottom of the tank, said conveyer being so mounted that said flights are adapted to engage the end wall of the tank above said rounded corner and to sweep over the latter in a downward movement whereby they are effective to sweep the settled sludge from the rounded corner and from the entire bottom surface of the tank into the hopper.

8. In sewage disposal apparatus, the combination with a settling tank having the corner at one end where the bottom joins the end wall rounded and having at the other end a depressed hopper, of an endless conveyer extending from one end of the tank to the other and having flights pivotally mounted thereon on axes transverse to the tank and adapted to move around said pivots in the lower run of the conveyer to engage the bottom of the tank, said conveyer being so mounted that said flights are adapted to engage the end wall of the tank above said rounded corner and to sweep over the latter in a downward movement whereby they are effective to sweep the entire mass of settled sludge from the bottom surface of the tank into the hopper.

9. In sewage disposal apparatus, the combination with a settling tank having a substantially vertical end wall and where the bottom joins the said wall a rounded corner, of sludge-removing means at the opposite end of the tank, an endless conveyer operating in said tank, arms pivotally secured to said conveyer, flights carried by said arms and adapted to contact with said rounded corner and the bottom of the tank to thereby effect a substantially complete removal of said sludge from said tank and to the sludge-removing means, said arms extending rearwardly with respect to the direction of movement of said conveyer and forming an acute angle with the latter, and means associated with said arms for maintaining an acute angle while permitting a predetermined angular movement of the arms with respect to the conveyer.

10. In sewage disposal apparatus, the combination with a settling tank having a substantially vertical end wall and where the bottom joins the said wall a rounded corner, sludge removing means at the opposite end of the tank, an endless conveyer operating in said tank, arms pivotally secured to said conveyer, flights carried by said arms and adapted to contact with the said rounded corner and the bottom of the tank to thereby effect a substantially complete removal of said sludge from said tank and to the sludge-removing means, and shoulders on said arms adapted to engage portions of the conveyer to limit the swinging movement of said arms with respect to the conveyer.

11. In sewage disposal apparatus, the combination with a settling tank having a substantially vertical end wall and where the bottom joins the said side wall a rounded corner, of sludge-removing means at the opposite end of the tank, an endless conveyer operating in said tank, arms projecting from said conveyer, flights slidably secured to said arms permitting adjustment thereof to and from the conveyer, said flights adapted to contact with the said rounded corner and the bottom of the tank to thereby effect a substantially complete removal of said sludge from said tank and to the sludge-removing means, and means carried by the conveyer and acting on said flights to maintain them resiliently in an extended position relative to said arms.

12. In sewage disposal apparatus, the combination with a settling tank having a substantially vertical end wall and where the bottom joins the said end wall a rounded corner, of sludge-removing means at the opposite end of the tank, an endless conveyer operating in said tank, arms projecting from said conveyer, flights slidably secured to said arms permitting adjustment thereof to and from the conveyer, said flights adapted to contact with the said rounded corner and the bottom of the tank to thereby effect a substantially complete removal of said sludge from said tank and to the sludge-removing means, and gravity actuated means carried by the conveyer and acting on said flights to maintain them resiliently in an extended position relative to the conveyer.

13. In sewage disposal apparatus, the combination with a settling tank having a substantially vertical end wall and where the bottom joins the said end wall a rounded corner, of sludge removing means at the opposite end of the tank, an endless conveyer operating in said tank, arms projecting from said conveyer, flights slidably secured to said arms permitting adjustment thereof to and from the conveyer, said flights adapted to contact with the said rounded corner and the bottom of the tank to thereby effect a substantially complete removal of said sludge from said tank and to the sludge-removing means, and weighted levers pivotally mounted on the conveyer and operatively engaging said flights to maintain them in an extended position relative to the conveyer.

14. In sewage disposal apparatus, the combination with a settling tank having a substantially vertical end wall and where the bottom joins the said end wall a rounded corner, of sludge-removing means at the opposite end of the tank, an endless conveyer operating in said tank, arms projecting from said conveyer, flights slidably secured to said arms permitting adjustment thereof to and from the conveyer, said flights adapted to contact with the said rounded corner and the bottom of the tank to thereby effect a subsantially complete removal of said sludge from said tank and to the sludge removing means, and springs operative on the flights to maintain them in an extended position relative to the conveyer.

MARCUS B. TARK.